(12) United States Patent
Bergeron et al.

(10) Patent No.: US 11,461,353 B2
(45) Date of Patent: Oct. 4, 2022

(54) IDENTIFYING AND EXTRACTING ADDRESSES WITHIN CONTENT

(71) Applicant: Microsoft Technology Licensing, LLC, Redmond, WA (US)

(72) Inventors: Paul D. Bergeron, San Francisco, CA (US); Ted J. Tomlinson, Oakland, CA (US); Junzhe Miao, San Jose, CA (US); Gurbir Singh, San Leandro, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 677 days.

(21) Appl. No.: 16/234,352

(22) Filed: Dec. 27, 2018

(65) Prior Publication Data
US 2020/0210442 A1 Jul. 2, 2020

(51) Int. Cl.
| | | |
|---|---|---|
| *G06F 16/00* | (2019.01) | |
| *G06F 16/25* | (2019.01) | |
| *G06F 16/22* | (2019.01) | |
| *G06N 20/00* | (2019.01) | |
| *G06F 16/215* | (2019.01) | |
| *G06F 16/955* | (2019.01) | |
| *G06F 16/23* | (2019.01) | |

(52) U.S. Cl.
CPC ......... *G06F 16/254* (2019.01); *G06F 16/215* (2019.01); *G06F 16/2255* (2019.01); *G06F 16/2365* (2019.01); *G06F 16/9566* (2019.01); *G06N 20/00* (2019.01)

(58) Field of Classification Search
None
See application file for complete search history.

(56) References Cited

U.S. PATENT DOCUMENTS

| 6,339,795 B1 * | 1/2002 | Narurkar | G06F 16/258 709/246 |
|---|---|---|---|
| 8,285,656 B1 * | 10/2012 | Chang | G06Q 50/01 706/15 |
| 2009/0119268 A1 * | 5/2009 | Bandaru | G06Q 10/0631 705/7.12 |
| 2013/0110791 A1 * | 5/2013 | Cai | G06F 16/3344 707/689 |
| 2018/0285773 A1 * | 10/2018 | Hsiao | G06Q 30/04 |
| 2019/0171755 A1 * | 6/2019 | Yanez | G06N 5/003 |

* cited by examiner

*Primary Examiner* — Anhtai V Tran
(74) *Attorney, Agent, or Firm* — Schwegman Lundberg & Woessner, P.A.

(57) ABSTRACT

The disclosed embodiments provide a system for processing data. During operation, the system extracts text windows of varying length from text in one or more content items associated with an entity. Next, the system applies a machine learning model to features for the text windows to produce scores representing the likelihoods that the text windows contain addresses. The system then identifies, based on the scores and validation rules applied to the text windows, one of the text windows as an address for the entity. Finally, the system stores the selected text window as the address for the entity.

15 Claims, 5 Drawing Sheets

IDENTIFYING AND EXTRACTING ADDRESSES WITHIN CONTENT

BACKGROUND

Field

The disclosed embodiments relate to data extraction. More specifically, the disclosed embodiments relate to techniques for identifying and extracting addresses within content.

Related Art

Online networks may include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as services that allow the individuals and/or organizations to establish and maintain professional connections, list work and community experience, endorse and/or recommend one another, promote products and/or services, and/or search and apply for jobs.

In turn, users and/or data in online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for identifying and extracting addresses within content. For example, the disclosed embodiments may involve identifying addresses of entities such as companies within content items associated with the entities, such as web pages and/or websites for the entities. In turn, the identified addresses may be used to update location records for the entities and/or provide location-based services related to the entities.

To identify addresses within a content item, text windows of varying length are extracted from cleaned text in the content item. For example, text in a web page may be cleaned to remove markup, scripts, style sheets, phone numbers, and/or email addresses from the text; remove tokens that frequently appear next to addresses from the text; normalize whitespace and/or post office box variations in the text; and/or remove formatting characters or symbols in the text. A set of "sliding windows" of text that span the lengths of valid addresses in a given locale (e.g., a country, region, etc.) may then be extracted from the cleaned text.

A machine learning model is applied to the text windows to produce scores representing likelihoods that the text windows contain addresses. For example, fixed-length vector representations of each text window and/or additional features associated with the text window may be inputted into a logistic regression model, and the logistic regression model may output a score representing the probability that the text window contains an address.

Scores outputted by the machine learning model are also adjusted based on a set of validation rules. For example, the validation rules may increase or decrease the score for a text window based on address labels for tokens within the text window and/or a Uniform Resource Locator (URL) of a content item from which the text window was obtained. The text window with the highest adjusted score is then selected as the address for the entity associated with the content item.

By applying machine learning techniques and address validation rules to multiple text windows in content items, the disclosed embodiments may identify addresses within the content items. As a result, the disclosed embodiments may allow addresses to be automatically extracted from content items associated with entities without requiring human intervention and/or oversight. In contrast, conventional techniques may involve crowdsourcing and/or human verification of the addresses, which may be costlier, slower, and/or more error-prone. Consequently, the disclosed embodiments may improve the accuracy, operation, and use of location-based services and technologies, as well as applications and computer systems in which the services and technologies execute.

Identifying and Extracting Addresses within Content

Figure 1:
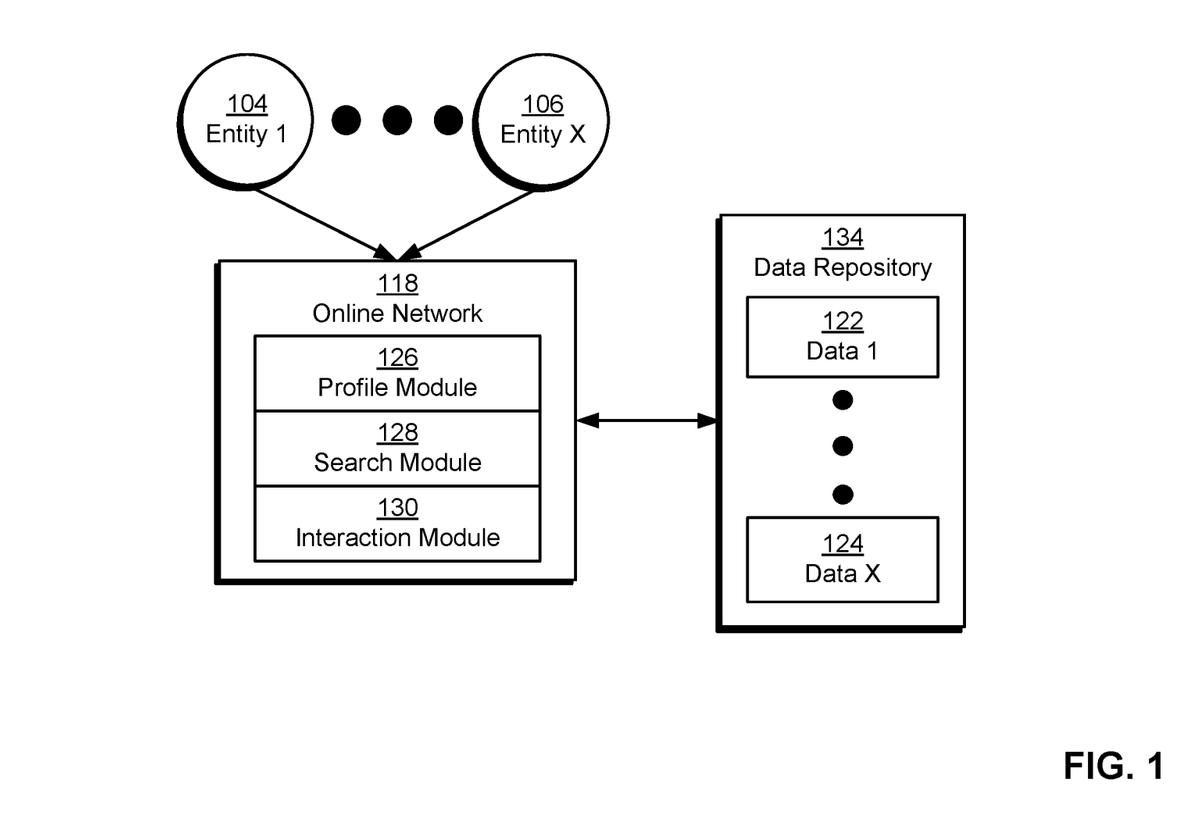
FIG. 1 shows a schematic of a system in accordance with the disclosed embodiments.

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

To improve the quality or relevance of the recommendations and/or improve the user experience with searches, applications, inquiries, and/or placements of jobs or other types of opportunities, online network 118 may use addresses and/or other location data associated with the corresponding schools, companies, and/or entities associated with the jobs or opportunities to provide additional functionality and/or insights related to the locations of the entities. For example, online network 118 may allow job seekers to view job listings on a map, estimate commute times to the jobs using various modes of transportation (e.g., walking, cycling, public transit, driving, etc.), and/or search for and/or filter jobs by distance or commute time. In another example, online network 118 may use commute time as a factor in selecting or ordering job recommendations for job seekers. In a third example, online network 118 may allow users of advertising, marketing, recruiting, sales, and/or other types of solutions to perform searches and/or targeting based on the locations and/or addresses of entities.

On the other hand, online network 118 may lack comprehensive addresses and location data for the entities. For example, representatives of companies and/or other entities may omit exact addresses or location data from job listings, events, and/or other types of posts in online network 118. In another example, profiles for the companies and/or other entities may be created with online network 118 without requiring the entities to specify their exact addresses or physical locations. In a third example, address or location information for a user or company may become outdated after the user or company relocates to a new address or location.

In one or more embodiments, online network 118 includes functionality to identify and extract addresses from content associated with companies and/or other entities in online network 118. As discussed in further detail below, online network 118 analyzes "sliding windows" of text in the content for patterns that are indicative of addresses and/or location data for the entities. Online network 118 also uses machine learning techniques and/or address validation rules to select, for each entity, a text window that is most likely to contain an address for the entity. Online network 118 then uses the text window as the address and/or location of the entity.

Figure 2:
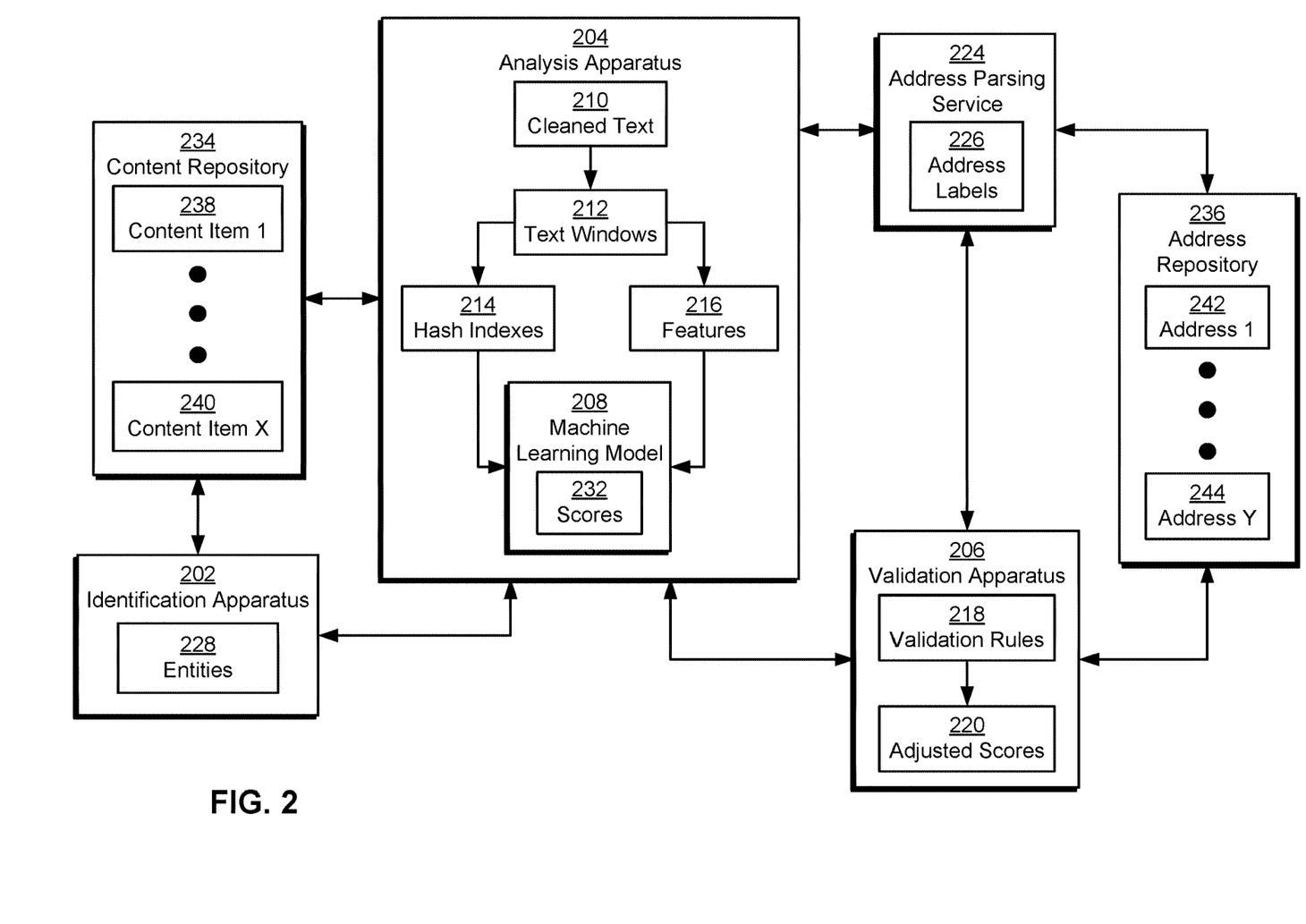
FIG. 2 shows a system for processing data in accordance with the disclosed embodiments.

FIG. 2 shows a system for processing data in accordance with the disclosed embodiments. As shown in FIG. 2, the system includes an identification apparatus 202, an analysis apparatus 204, and a validation apparatus 206. Each of these components is described in further detail below.

Identification apparatus 202 identifies a set of entities 228 for which address and/or other location data is to be verified. For example, identification apparatus 202 may identify companies, schools, organizations, businesses, people, and/or other entities 228 with physical addresses and/or locations that are missing, outdated, and/or require verification. In another example, identification apparatus 202 may identify entities 228 as company-city pairs that include a company (or other organization) and a city in which the company is located. Thus, multiple locations of a single company (e.g., a larger and/or multinational company) may be differentiated by one another using the company-city pairs.

Identification apparatus 202 also, or instead, populates a content repository 234 with content items (e.g., content item 1 238, content item x 240) associated with entities 228. For example, identification apparatus 202 may obtain the content items as web pages, websites, documents, articles, posts, and/or other content that belongs to and/or mentions names and/or other attributes of entities 228. In another example, identification apparatus 202 may obtain URLs of websites associated with entities 228 from profile data for entities 228, public records associated with entities 228, and/or other sources of data related to entities 228. Identification apparatus 202 may access the websites at the URLs and download and/or scrape web pages from the websites up to a certain depth (e.g., all web pages within a website, web pages that are directly linked from the home page of a website, web pages that are reached within a certain number of clicks from the home page, etc.).

Analysis apparatus 204 identifies portions of content items from identification apparatus 202 and/or in content repository 234 that are likely to contain addresses for the corresponding entities. First, analysis apparatus 204 obtains text from one or more content items for a given entity. For example, analysis apparatus 204 may extract text from one or more web pages within an entity's website by removing markup, scripts, style sheets, images, audio, and/or video from the web pages. In another example, analysis apparatus may apply a speech-recognition technique, optical character recognition (OCR) technique, and/or other technique for extracting text from images, audio, video, and/or other non-text-based content items to convert the content items into a text-based format.

Analysis apparatus 204 processes and/or standardizes the extracted text to generate cleaned text 210 that can be analyzed effectively for address and/or location data. For example, analysis apparatus 204 may clean the extracted text by removing phone numbers and email addresses from the text (e.g., using regular expressions representing phone numbers and email addresses), removing tokens that frequently appear next to addresses from the text (e.g., "tel," "fax," "phone," "details," "address," "website," "contact us," "contact," "call us," "email," etc.), normalizing whitespace in the text (e.g., converting whitespace characters and/or compressing repeating whitespace into a single space), normalizing post office box variations in the text (e.g., converting all variations into "P.O. Box"), and/or removing formatting in the text (e.g., replacing periods, pipes, exclamation marks, tildes, middle dots, and/or other characters that are commonly used in formatting addresses with a single space). In turn, cleaned text 210 from a given content item may include a single line of text containing words and/or tokens that are separated by single spaces.

Next, analysis apparatus 204 extracts text windows 212 of varying length from cleaned text 210. Each text window may include a series of consecutive tokens of a certain length from cleaned text 210. For example, analysis apparatus 204 may generate text windows 212 as multiple "sliding windows" of consecutive tokens from the beginning of cleaned text 210 to the end of cleaned text 210. The sliding windows may span the lengths of valid addresses in a given locale (e.g., text windows 212 of 5-45 words may be extracted from cleaned text 210 to identify United States (US) mailing addresses from the text). The sliding windows may further be required to end at tokens representing address endings in cleaned text 210 (e.g., tokens matching five-digit zip codes in US mailing addresses).

Analysis apparatus 204 converts text windows 212 into hash indexes 214 and features 216 that are inputted into a machine learning model 208. Hash indexes 214 include fixed-length vector representations of text windows 212 that are based on hash values of words and/or tokens in text windows 212. For example, analysis apparatus 204 may apply a first hash function to each token in a text window to generate a hash value representing an index into a fixed-length vector representation of the text window. Analysis apparatus 204 may then update the value of the vector's element at the index with the number of times the token appears in the text window. To mitigate the effect of hash collisions among the tokens on hash indexes 214, analysis apparatus 204 may optionally apply a second single-bit hash function to the token to determine the sign of the update at the vector's element before applying the update to the element.

Features 216 include binary features that indicate the presence or absence of various address components in text windows 212. For example, features 212 may include binary values that indicate the presence or absence of numeric zip codes, two-letter state abbreviations (e.g., "NY" or "CA"), full state names (e.g., "New York" or "California"), compass directions (e.g., "n," "e," "s," "w," "north," "east," "south," "west," etc.), post office boxes, numbers in the beginning of a text window, and/or known street types (e.g., "blvd," "street," "circle," "rd," "loop," "ave," "fwy," "lane," "pkwy," "pass," "trail," etc.) in text windows 212 that are analyzed for patterns related to US mailing addresses.

In one or more embodiments, machine learning model 208 uses hash indexes 214 and features 216 to produce scores 232 representing the likelihoods that the corresponding text windows 212 contain addresses. For example, machine learning model 208 may include a logistic regression model that outputs a score from 0 to 1 representing the probability that a text window contains an address, based on a vector representation of the text window and/or binary features 216 associated with address components in the text window. Analysis apparatus 204 and/or another component of the system may train the logistic regression model using positive examples containing real, complete mailing addresses (e.g., complete US mailing addresses). The component may generate negative examples for use in training the logistic regression model from text windows 212 in content items that are similar to those from which addresses are to be extracted (e.g., web pages and/or websites for companies). The negative examples may be generated in a way that reflects the distribution of word counts in the positive examples. The negative examples may also be filtered to remove actual addresses that are inadvertently selected from the content items. A subset of negative examples may include text snippets that are generated and/or selected to have strong indications of addresses but that do not contain actual addresses. In turn, the logistic regression model may be trained to predict labels for the positive and negative examples based on the corresponding hash indexes 214 and features 216.

After machine learning model 208 is trained, analysis apparatus 204 applies machine learning model 208 to hash indexes 214 and features 216 for text windows 212 associated with entities 228 identified by identification apparatus 202 (e.g., entities 228 with missing and/or outdated addresses) to produce scores 232 for text windows 212. For example, analysis apparatus 204 may rank text windows 212 from content items associated with a given entity by descending score from machine learning model 208. Analysis apparatus 204 may optionally adjust scores 232 and/or positions of text windows 212 in the ranking based on URLs and/or other attributes of content items from which text windows 212 were extracted. For example, analysis apparatus 204 may increase the score and/or position of a text window in the ranking when the text window is found in the home page and/or an "about" page of the entity's website.

Analysis apparatus 204 uses scores 232 to identify a subset of text windows 212 that are most likely to contain addresses. For example, analysis apparatus 204 may select a pre-specified number of highest-ranked text windows 212 and/or a variable number of text windows 212 with scores 232 that exceed a threshold for inclusion in the subset.

Analysis apparatus 204 inputs the selected subset of text windows 212 into an address parsing service 224, and address parsing service 224 generates address labels 226 for different tokens within each text window. For example, address parsing service 224 may associate tokens within each text window with address labels 226 such as "house," "house number," "road," "unit," "level," "entrance," "post office box," "suburb," "city," "island," "state," "country," "postal code," and/or "region."

Validation apparatus 206 uses scores 232 outputted by machine learning model 208, address labels 226 from address parsing service 224, and a set of validation rules 218 to select a given text window as an address for an entity. In one or more embodiments, validation apparatus 206 applies validation rules 218 to tokens associated with address labels 226 from address parsing service 224 to generate adjusted scores 220 for the corresponding text windows 212. Each validation rule may include a condition associated with one or more attributes of a text window; when the condition is met, validation apparatus 206 increases or decrease the score for the text window.

For example, validation rules 218 may include a rule that verifies a start of an address (e.g., a house number, unit, and/or post office box) at a beginning of a text window. When the rule is met, validation apparatus 206 may increase the score of the text window. In another example, validation rules may compare a "house number" label and/or another type of address label with a maximum number of tokens. When the maximum number of tokens is exceeded, validation apparatus 206 may decrease the score of the text window. In a third example, validation apparatus 206 may decrease the score of the text window when a "road" label (i.e., the label for a street or road component of an address) produced by address parsing service 224 contains a number.

Finally, validation apparatus 206 selects a text window with a highest adjusted score as an address (e.g., address 1 242, address y 244) for the corresponding entity and stores the address in an address repository 236. For example, validation apparatus 206 may store a mapping from a name, company-city pair, and/or other identifier for the entity to the address in a relational database, filesystem, data warehouse, flat file, and/or another data store providing address repository 236. Validation apparatus 206 may also, or instead, store a mapping from the identifier to address labels 226 for the address in address repository 236.

When multiple valid addresses are found in one or more content items associated with an entity (e.g., one or more web pages in a website for the entity), validation apparatus 206 may assign one or more of the addresses to the entity based on attributes associated with the addresses and/or content items from which the addresses were extracted. For example, validation apparatus 206 may set the entity's address to the most frequently occurring address in a set of web pages for the entity. In another example, validation apparatus 206 may set the entity's address to an address that appears in the home page and/or "about" page in the entity's website. In a third example, validation apparatus 206 may select, as the entity's address, an address that appears in proximity to words such as "tel," "fax," "phone," "details," "address," "website," "contact us," "contact," "call us," and/or "email." In a fourth example, validation apparatus 206 may select, as the address for a company-city pair representing the entity, an address with a city that matches the city in the company-city pair.

After an address is identified and stored for an entity, the address may be outputted and/or used to improve location-based services associated with the entity. For example, an address stored in association with the entity in address repository 236 may be included in one or more job listings for the entity, a company listing for the entity, and/or other information related to the entity. In another example, the address may be used to estimate a commute time for a job candidate to the entity based on the job candidate's location or address, a specified method of transportation (e.g., walking, cycling, driving, public transit, etc.), and/or a time of day of the commute. In a third example, the job candidate may filter the job listings by commute time. In a fourth example, job recommendations for the job candidate may be generated and/or ordered based on commute time, distance between the job candidate and entity, and/or other location-based criteria.

By applying machine learning techniques and address validation rules to multiple text windows in content items, the disclosed embodiments may identify addresses within the content items without requiring crowdsourcing and/or human verification of the addresses. Consequently, the disclosed embodiments may improve the accuracy, operation, and use of location-based services and technologies, as well as applications and computer systems in which the services and technologies execute.

Those skilled in the art will appreciate that the system of FIG. 2 may be implemented in a variety of ways. First, identification apparatus 202, analysis apparatus 204, validation apparatus 206, content repository 234, and/or address repository 236 may be provided by a single physical machine, multiple computer systems, one or more virtual machines, a grid, one or more databases, one or more filesystems, and/or a cloud computing system. Identification apparatus 202, analysis apparatus 204, and/or validation apparatus 206 may additionally be implemented together and/or separately by one or more hardware and/or software components and/or layers. Various components of the system may further be configured to execute in an offline, online, and/or nearline basis to perform different types of processing related to identifying, extracting, validating, and/or selecting addresses.

Second, the system may be adapted to different types of entities, content, and/or addresses. For example, the system may be configured to identify, extract, validate, and/or select addresses for entities in various countries, regions, and/or locales based on patterns and/or structures associated with the addresses.

Third, a number of machine learning models and/or techniques may be used to generate scores 232 and/or adjusted scores 220. For example, the functionality of machine learning model 208 may be provided by a regression model, artificial neural network, support vector machine, decision tree, random forest, gradient boosting tree, naïve Bayes classifier, Bayesian network, clustering technique, collaborative filtering technique, deep learning model, hierarchical model, and/or ensemble model.

Moreover, the same machine learning model 208 or separate machine learning models may be used to generate scores 232 for various groupings of entities, content items, and/or addresses. For example, different machine learning models and/or different versions of a machine learning model may be used to identify addresses from different parts of the world. In a second example, multiple machine learning models may be used with different sets of features (e.g., hash indexes 214, features 216, etc.) associated with text windows 212 and/or the corresponding entities 228 or content items to produce multiple scores that predict the likelihood that text windows 212 contain valid and/or complete addresses. The scores may then be combined with a set of weights and/or inputted into an additional machine learning model or formula to obtain final scores that are used to select a single text window as the "best" address for an entity.

Figure 3:
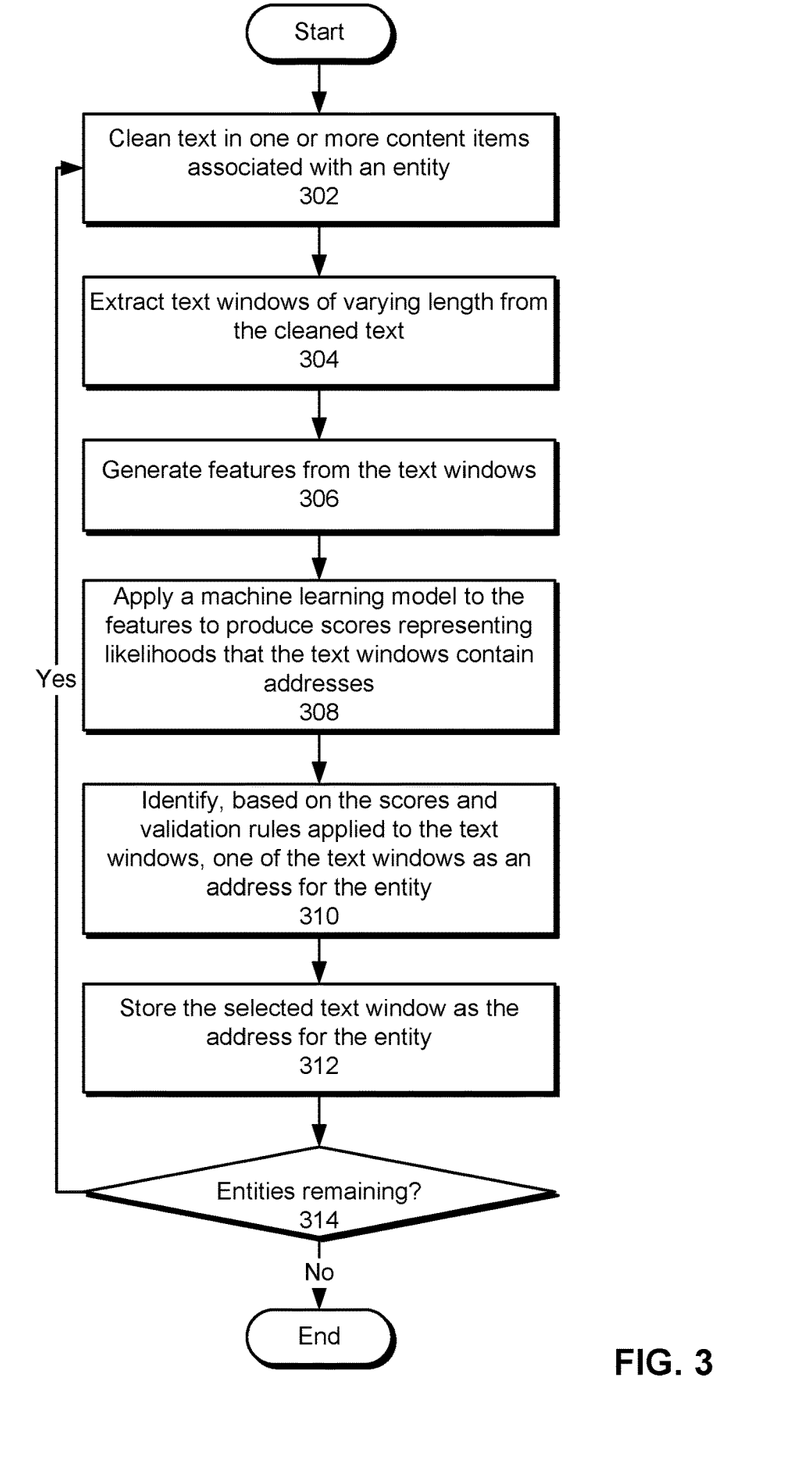
FIG. 3 shows a flowchart illustrating a process of identifying and extracting addresses within content in accordance with the disclosed embodiments.

FIG. 3 shows a flowchart illustrating a process of identifying and extracting addresses within content in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, text in one or more content items associated with an entity is cleaned (operation 302). For example, the text may be extracted from web pages, documents, articles, images, audio, video, and/or other content associated with a person, company, and/or organization. The extracted text may be cleaned by removing phone numbers and email addresses from the text, removing tokens that frequently appear next to addresses from the text, normalizing whitespace in the text, normalizing post office box variations in the text, and/or removing formatting in the text. In turn, the cleaned text may include a single line of text that contains words and/or tokens separated by spaces.

Next, text windows of varying length are extracted from the cleaned text (operation 304). For example, the text windows may be generated to contain varying numbers of tokens associated with valid addresses in a given locale. The text windows may also be positioned to end at tokens representing address endings in the cleaned text (e.g., zip codes, postal codes, etc.).

Features are then generated from the text windows (operation 306). For example, hash values may be generated from tokens in a text window, and a feature vector for the text window may be created by updating elements of the feature vector based on indexes represented by the hash values. In another example, the features may include binary features indicating the presence or absence of various address components in the text window (e.g., zip codes, state abbreviations, states, compass directions, post office boxes, street types, a number at a start of a text window, etc.).

A machine learning model is applied to the features to produce scores representing likelihoods that the text windows contain addresses (operation 308). For example, the machine learning model may include a logistic regression model, deep learning model, and/or other type of classification model that generates numeric output indicating the probability that a text window inputted into the machine learning model contains a valid, complete address.

One of the text windows is identified as an address for the entity based on the scores and validation rules applied to the text windows (operation 310), as described in further detail below with respect to FIG. 4. Finally, the identified text window is stored as the address for the entity (operation 312). For example, the address may be stored with a company-city pair and/or another identifier representing the entity. The address may then be included in a job listing and/or company page for the entity, used to determine a commute time for a job candidate, and/or provide other location-based information or services associated with the entity.

Operations 302-312 may be repeated for remaining entities (operation 314). For example, text windows may be extracted from cleaned text (operations 302-304) for a set of entities with missing and/or outdated addresses, and machine learning models and validation rules may be applied to the text windows and/or associated features to identify and store addresses (operations 306-312) for the entities.

Figure 4:
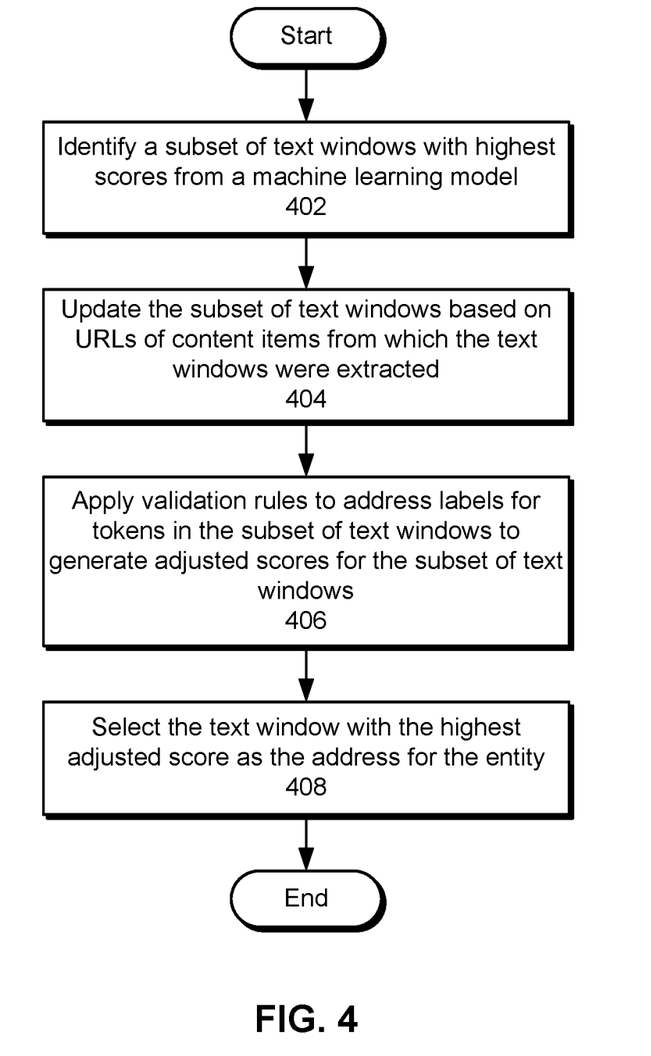
FIG. 4 shows a flowchart illustrating a process of selecting an address for an entity in accordance with the disclosed embodiments.

FIG. 4 shows a flowchart illustrating a process of selecting an address for an entity in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a subset of text windows with highest scores from a machine learning model is identified (operation 402). For example, the subset of text windows may be associated with the highest probabilities of containing addresses, as determined by a logistic regression model. Next, the subset of text windows is updated based on URLs of content items from which the text windows were extracted (operation 404). For example, a text window may be added to the subset when the text window is extracted from a home page or "about" page of the entity's website.

Validation rules are then applied to address labels for tokens in the subset of text windows to generate adjusted scores for the subset of text windows (operation 406). For example, the validation rules may validate a start of an address at a beginning of a text window, validate a number of tokens associated with an address label, and/or validate a road label associated with the text window. When a condition specified in a validation rule is met by the corresponding text window, the score for the text window may be increased, decreased, and/or scaled by a corresponding numeric factor.

Finally, the text window with the highest adjusted score is selected as the address for the entity (operation 408). For example, the text window with a score that indicates the strongest likelihood of containing an address after validation rules have been applied to the text window may be selected as the entity's address. When multiple valid addresses are identified for the entity, additional criteria may be used to identify a single address as the primary address for the entity.

Figure 5:
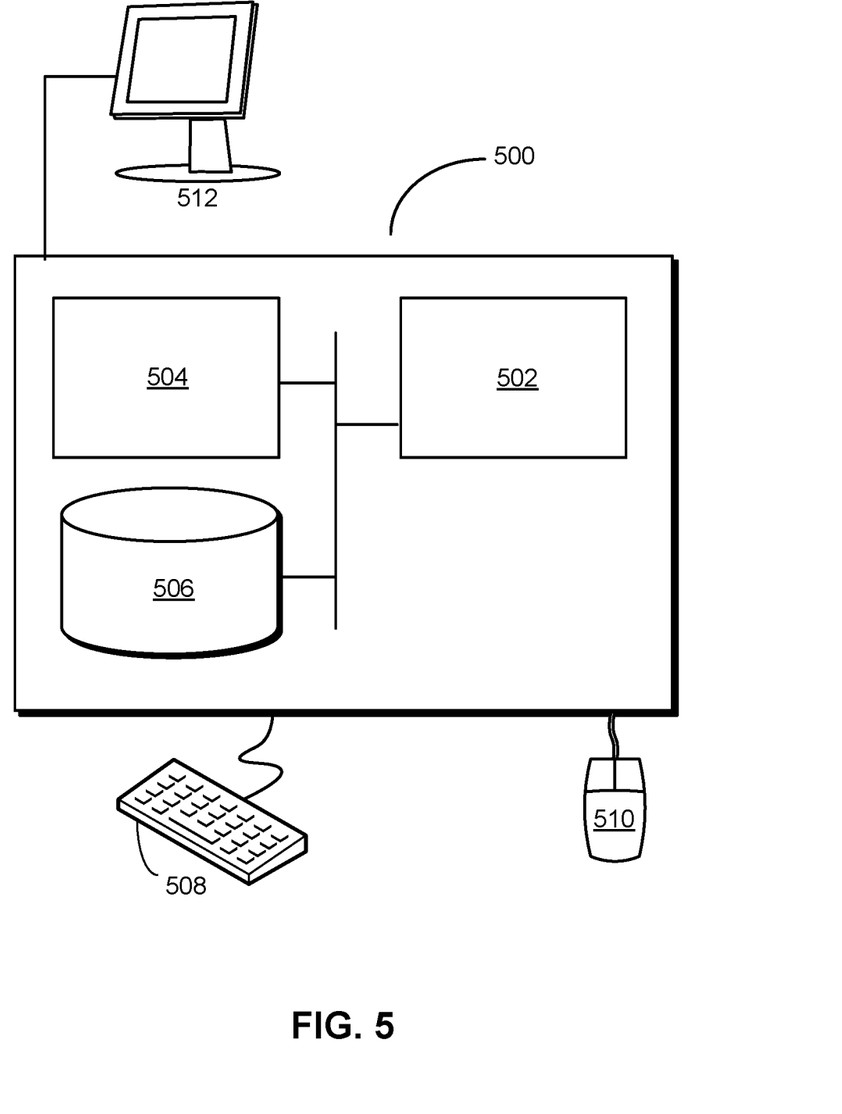
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes an analysis apparatus and a validation apparatus, one or more of which may alternatively be termed or implemented as a module, mechanism, or other type of system component. The analysis apparatus extracts text windows of varying length from text in one or more content items associated with an entity. Next, the analysis apparatus applies a machine learning model to features for the text windows to produce scores representing the likelihoods that the text windows contain addresses. The validation apparatus then identifies, based on the scores and validation rules applied to the text windows, one of the text windows as an address for the entity. Finally, the validation apparatus stores the selected text window as the address for the entity.

In addition, one or more components of computer system 500 may be remotely located and connected to the other components over a network. Portions of the present embodiments (e.g., identification apparatus, analysis apparatus, validation apparatus, content repository, address repository, online network, etc.) may also be located on different nodes of a distributed system that implements the embodiments. For example, the present embodiments may be implemented using a cloud computing system that identifies, extracts, and validates address and/or location for a set of remote entities.

By configuring privacy controls or settings as they desire, members of a social network, an online professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings, and is in compliance with applicable privacy laws of the jurisdictions in which the members or users reside.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
   identifying within text of one or more content items associated with an entity a token representing a known address ending;
   extracting a plurality of text windows from the text in the one or more content items, each text window having a number of tokens that is within a range for an expected number of tokens for an address for a particular location, and ending with the token representing the known address ending;
   for each text window in the plurality of text windows, applying, by a computer system, a machine learning model to features for the text window to produce for the text window a score representing a likelihood that the text window contains an address, the features for the text window derived from the tokens of the text window, by:
   generating hash values from tokens in the text window; and
   creating a feature vector for the text window by updating elements of the feature vector based on indexes represented by the hash values;
   identifying, by the computer system, based on the scores of the corresponding text windows as produced by the machine learning model and a set of validation rules applied to the text windows, one of the text windows as an address for the entity; and
   storing the selected one of the text windows as the address for the entity.

2. The method of claim 1, further comprising:
   generating the features for the text window from the tokens of the text window by:
   generating binary features indicating the presence or absence of known address components in the text window.

3. The method of claim 1, wherein extracting the plurality of text windows from the text in the one or more content items associated with the entity comprises:
   generating the text windows to have varying lengths and to contain varying numbers of tokens associated with valid addresses.

4. The method of claim 1, wherein identifying one of the text windows as the address for the entity comprises:
   identifying, based on the scores, a subset of the plurality of text windows with highest scores produced by the machine learning model;
   applying the validation rules to address labels associated with tokens in the subset of the plurality of text windows to generate adjusted scores for the subset of the plurality of text windows; and selecting one of the text windows with a highest adjusted score as the address for the entity.

5. The method of claim 1, further comprising:
cleaning the text in the one or more content items prior to extracting the plurality of text windows from the text.

6. The method of claim 2, wherein the address components comprise at least one of:
a zip code;
a state abbreviation;
a state;
a compass direction;
a post office box;
a street type; and
a number at a start of a text window.

7. The method of claim 4, wherein identifying one of the text windows as the address for the entity further comprises:
updating the subset of the plurality of text windows based on Uniform Resource Locators (URLs) of the one or more content items from which the text windows were extracted.

8. The method of claim 4, wherein applying the validation rules to address labels associated with tokens in the subset of the plurality of text windows comprises at least one of:
validating a start of an address at a beginning token of a text window;
validating a number of tokens associated with an address label; and
validating a road label associated with the text window.

9. The method of claim 5, wherein cleaning the text in the content item comprises at least one of:
removing phone numbers and email addresses from the text;
removing tokens that frequently appear next to addresses from the text;
normalizing whitespace in the text;
normalizing post office box variations in the text; and
removing formatting in the text.

10. A system comprising:
one or more processors; and
memory storing instructions that, when executed by the one or more processors, cause the system to:
identify within text of one or more content items associated with an entity a token representing a known address ending;
extract a plurality of text windows from the text in the one or more content items, each text window having a number of tokens that is within a range for an expected number of tokens for an address for a particular location and ending with the token representing the known address ending;
for each text window in the plurality of text windows, apply a machine learning model to features for the text window to produce for the text window a score representing a likelihood that the text window contains an address, the features for the text window derived from the tokens of the text window, by:
generating hash values from tokens in the text window; and
creating a feature vector for the text window by updating elements of the feature vector based on indexes represented by the hash values;
identify one of the text windows as an address for the entity based on i) the scores of the corresponding text windows as produced by the machine learning model, ii) Uniform Resource Locators (URLs) associated with the one or more content items from which a text windows was extracted, and iii) applying a set of validation rules to address labels associated with tokens in the text windows; and
store the selected one of the text windows as the address for the entity.

11. The system of claim 10, further comprising:
generating the features for the text window from the text of the text window by:
generating binary features indicating the presence or absence of address components in the text window.

12. The system of claim 10, wherein extracting the plurality of text windows from the text in the one or more content items associated with the entity comprises:
generating the text windows to have varying lengths and to contain varying numbers of tokens associated with valid addresses.

13. The system of claim 10, wherein applying the validation rules to address labels for tokens in the text windows comprises at least one of:
validating a start of an address at a beginning of a text window;
validating a number of tokens associated with an address label; and
validating a road label associated with the text window.

14. The system of claim 11, wherein the address components comprise at least one of:
a zip code;
a state abbreviation;
a state;
a compass direction;
a post office box;
a street type; and
a number at a start of a text window.

15. A non-transitory computer-readable storage medium storing instructions that when executed by a computer cause the computer to perform a method, the method comprising:
identifying within text of one or more content items associated with an entity a token representing a known address ending;
extracting a plurality of text windows from the text in the one or more content items associated with an entity, each text window having a number of tokens that is within a range for an expected number of tokens for an address for a particular location and ending with the token representing the known address ending;
for each text window in the plurality of text windows, applying a machine learning model to features for the text window to produce for the text window a score representing a likelihood that the text window contains an address, the features for the text window derived from the tokens of the text window, by:
generating hash values from tokens in the text window; and
creating a feature vector for the text window by updating elements of the feature vector based on indexes represented by the hash values;
identifying one of the text windows as an address for the entity, based on i) the scores of the corresponding text windows as produced by the machine learning model, ii) Uniform Resource Locators (URLs) associated with the one or more content items from which a text windows was extracted, and iii) applying a set of validation rules to address labels associated with tokens in the text windows, one of the text windows as an address for the entity; and storing the selected one of the text windows as the address for the entity.

\* \* \* \* \*